US011983310B2

United States Patent
Kocdemir et al.

(10) Patent No.: US 11,983,310 B2
(45) Date of Patent: May 14, 2024

(54) GAZE TRACKING APPARATUS AND SYSTEMS

(71) Applicant: Sony Interactive Entertainment Inc., Tokyo (JP)

(72) Inventors: Sahin Serdar Kocdemir, London (GB); Philip Cockram, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/344,312

(22) Filed: Jun. 10, 2021

(65) Prior Publication Data

US 2021/0397253 A1 Dec. 23, 2021

(30) Foreign Application Priority Data

Jun. 23, 2020 (GB) ...................................... 2009541

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0172* (2013.01)

(58) Field of Classification Search
CPC . G06F 3/013; G02B 27/0093; G02B 27/0172; G02B 2027/0138; G02B 2027/014; G02B 2027/0147; G02B 2027/0198; G02B 2027/0187
See application file for complete search history.

(56) References Cited

U.S. PATENT DOCUMENTS

| 2005/0225723 | A1* | 10/2005 | Pilu ........................ A61B 3/113 351/200 |
| 2014/0313129 | A1* | 10/2014 | Elvesjo ................. G06F 1/3231 345/156 |
| 2015/0055808 | A1* | 2/2015 | Vennstrom .............. H04S 7/307 381/307 |
| 2015/0309567 | A1* | 10/2015 | Park ........................ G06F 3/013 348/78 |
| 2016/0085301 | A1 | 3/2016 | Lopez |
| 2016/0358181 | A1* | 12/2016 | Bradski ............... H04L 63/0861 |
| 2019/0302464 | A1 | 10/2019 | Li |
| 2019/0361231 | A1* | 11/2019 | Kurz .................... G06V 10/147 |

(Continued)

FOREIGN PATENT DOCUMENTS

| WO | 2006108017 A1 | 10/2006 |
| WO | 2011057161 A1 | 5/2011 |

OTHER PUBLICATIONS

Combined Search and Examination Report for corresponding to GB2009541.0, 5 pages, dated Nov. 26, 2020.

(Continued)

*Primary Examiner* — Amit Chatly
(74) *Attorney, Agent, or Firm* — Matthew B. Dernier, Esq.

(57) ABSTRACT

A gaze tracking system comprising one or more cameras operable to capture one or more images of a side view of one or both of a user's eyes, a cornea identification unit operable to identify the location and size of a cornea in one or more of the captured images, a gaze detection unit operable to determine a direction of the user's gaze in dependence upon the identified location of the cornea in the one or more captured images.

11 Claims, 9 Drawing Sheets

(56) References Cited

U.S. PATENT DOCUMENTS

2019/0377191 A1    12/2019  Hughes
2020/0041797 A1     2/2020  Samec
2021/0174768 A1*    6/2021  Jarvenpaa ................ G09G 5/37

OTHER PUBLICATIONS

Extended European Search Report for corresponding application 21176212.5, 10 pages, dated Nov. 16, 2021.
Anonymous, "Hornhaut—Wikipedia", URL:https://de.wikipedia.org/w/index.php?title=Hornaut&oldid=200745195, 22 pages, Jun. 23, 2020, last edited on Oct. 31, 2021.

* cited by examiner

GAZE TRACKING APPARATUS AND SYSTEMS

BACKGROUND OF THE INVENTION

1. Field of the Invention

This disclosure relates to a gaze tracking system and method.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gaze tracking systems are used to identify a location of a subject's gaze within an environment; in many cases, this location may be a position on a display screen that is being viewed by the subject. In a number of existing arrangements, this is performed using one or more inwards-facing cameras directed towards the subject's eye (or eyes) in order to determine a direction in which the eyes are oriented at any given time. Having identified the orientation of the eye, a gaze direction can be determined and a focal region may be determined as the intersection of the gaze direction of each eye.

One application for which gaze tracking is considered of particular use is that of use in head-mountable display units (HMDs). The use in HMDs may be of particular benefit owing to the close proximity of inward-facing cameras to the user's eyes, allowing the tracking to be performed much more accurately and precisely than in arrangements in which it is not possibly to provide the cameras with such proximity.

By utilising gaze detection techniques, it may be possible to provide a more efficient and/or effective processing method for generating content or interacting with devices.

For example, gaze tracking may be used to provide user inputs or to assist with such inputs—a continued gaze at a location may act as a selection, or a gaze towards a particular object accompanied by another input (such as a button press) may be considered as a suitable input. This may be more effective as an input method in some embodiments, particularly in those in which a controller is not provided or when a user has limited mobility.

Foveal rendering is an example of a use for the results of a gaze tracking process in order to improve the efficiency of a content generation process. Foveal rendering is rendering that is performed so as to exploit the fact that human vision is only able to identify high detail in a narrow region (the fovea), with the ability to discern detail tailing off sharply outside of this region.

In such methods, a portion of the display is identified as being an area of focus in accordance with the user's gaze direction. This portion of the display is supplied with high-quality image content, while the remaining areas of the display are provided with lower-quality (and therefore less resource intensive to generate) image content. This can lead to a more efficient use of available processing resources without a noticeable degradation of image quality for the user.

It is therefore considered advantageous to be able to improve gaze tracking methods, and/or apply the results of such methods in an improved manner. It is in the context of such advantages that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
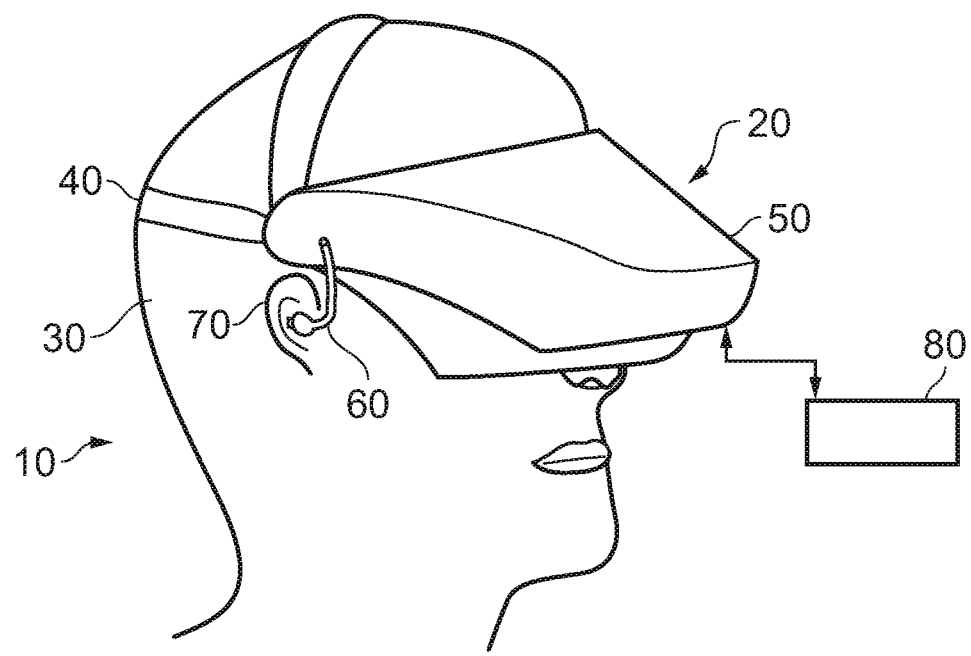
FIG. 1 schematically illustrates an HMD worn by a user.

Referring now to the drawings, wherein like reference numerals designate identical or corresponding parts throughout the several views, embodiments of the present disclosure are described. In FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
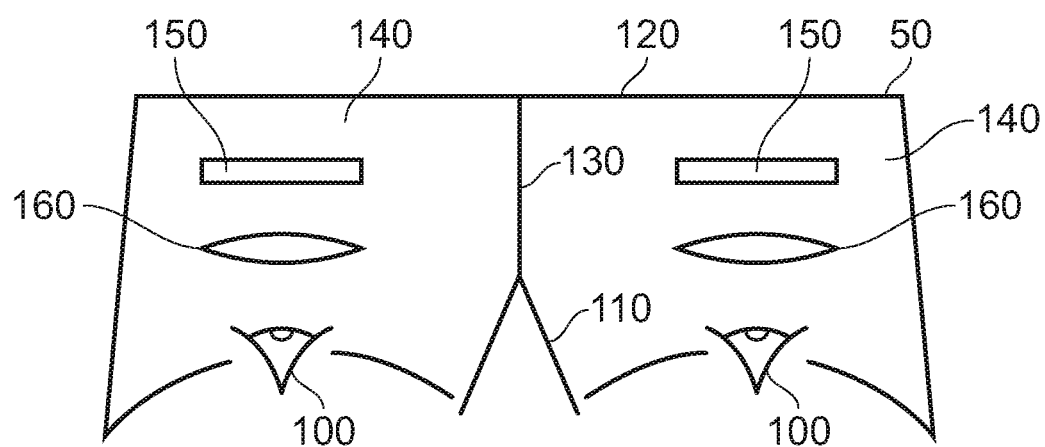
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
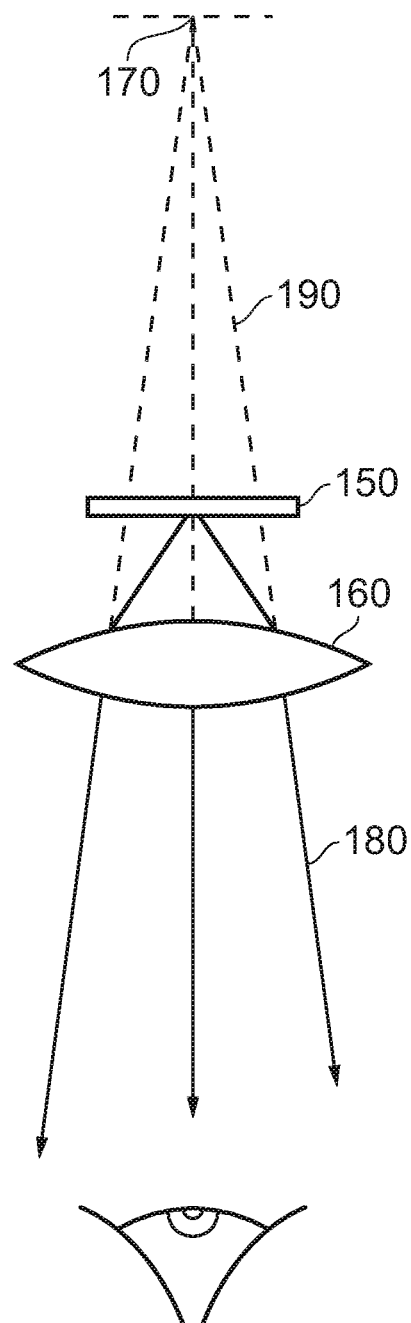
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
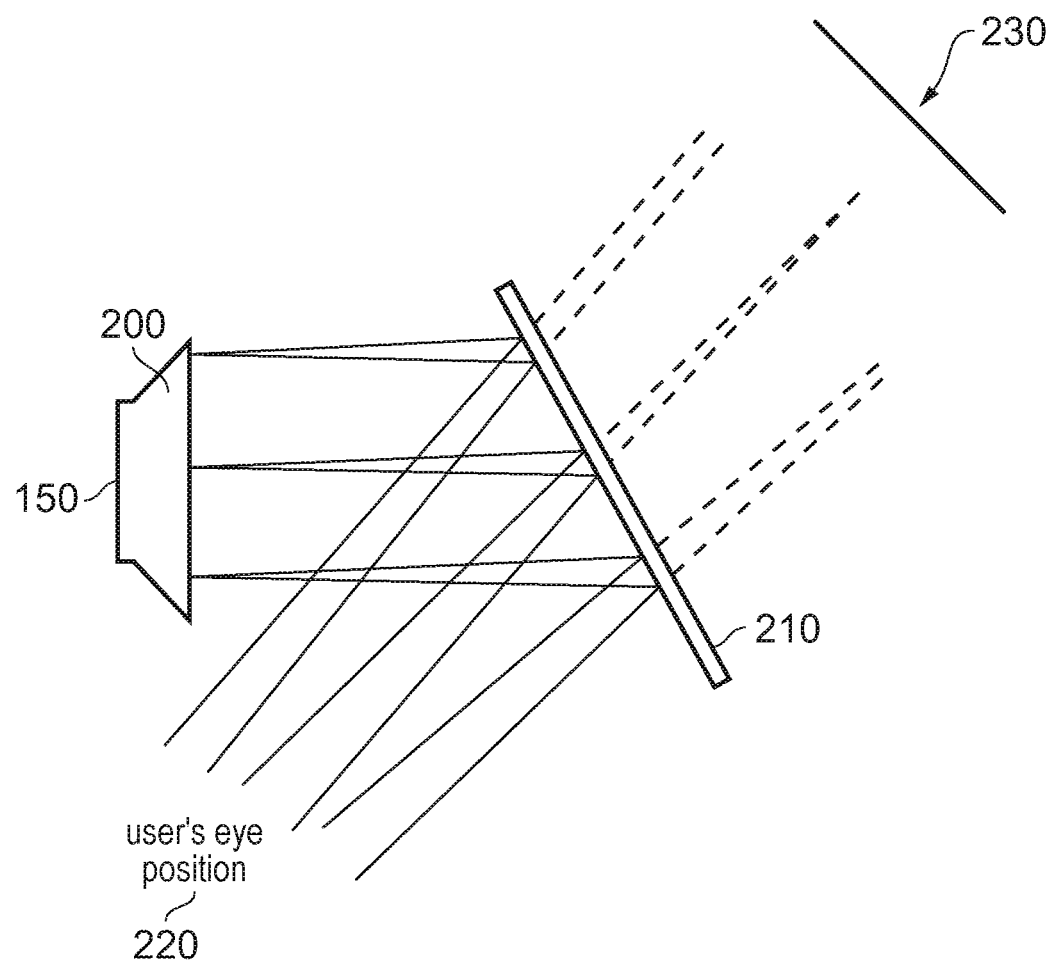
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
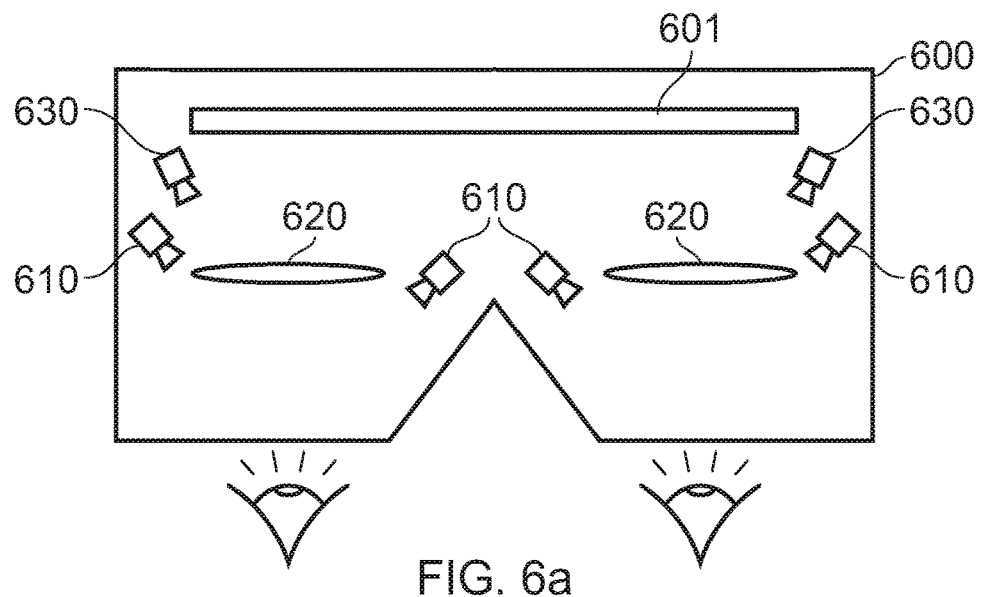
FIG. 6*a* schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 (with a display element 601) is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
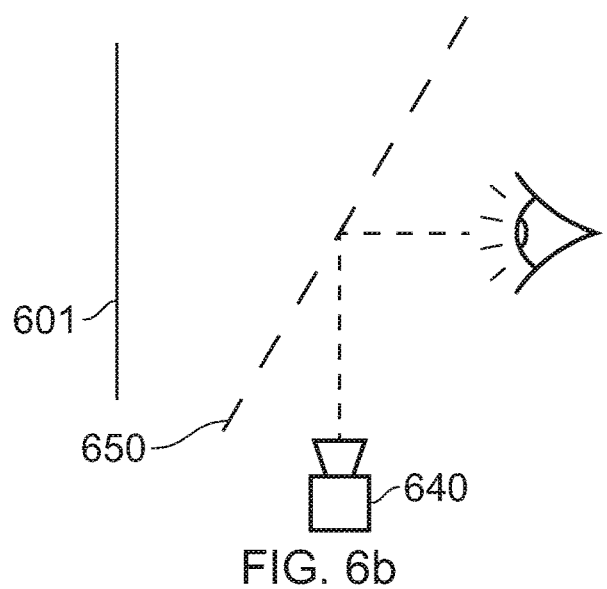
FIG. 6*b* schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
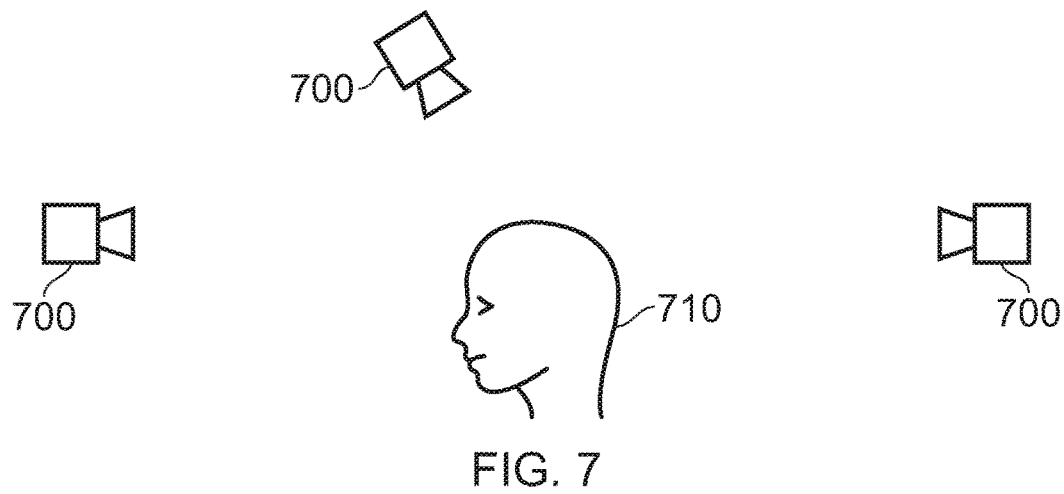
FIG. 7 schematically illustrates a remote tracking arrangement.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
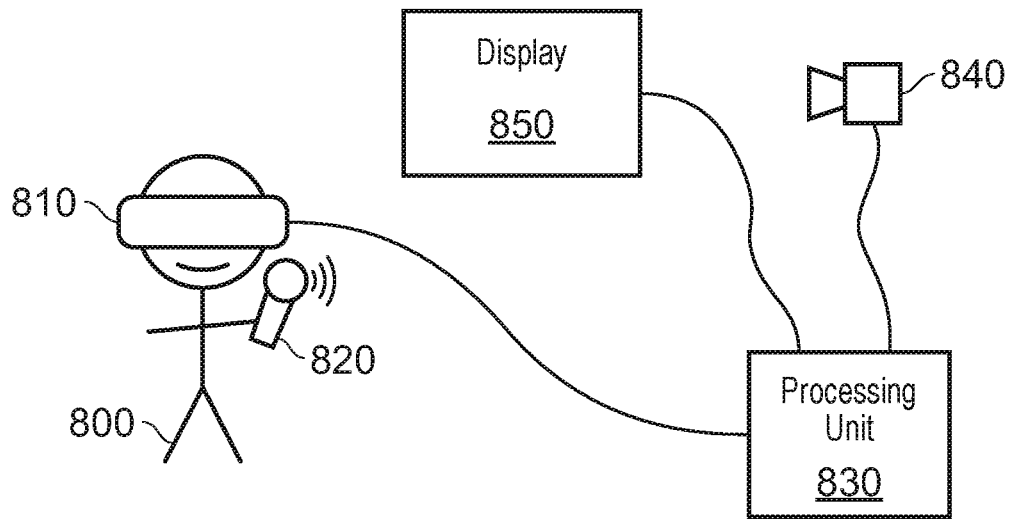
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
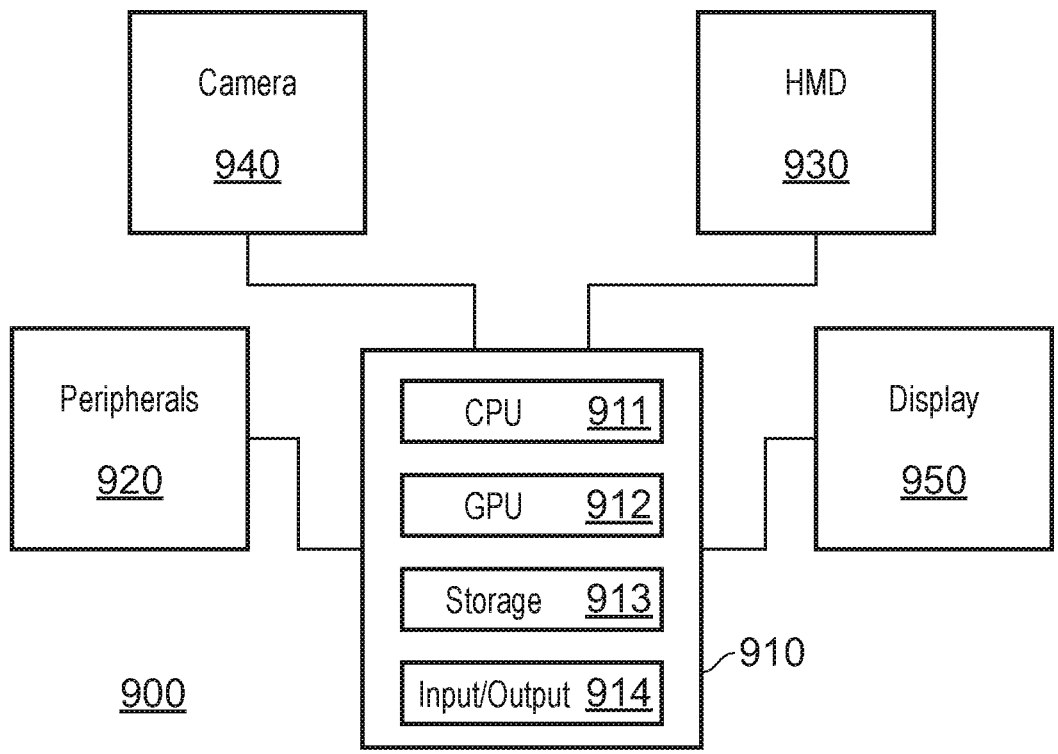
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
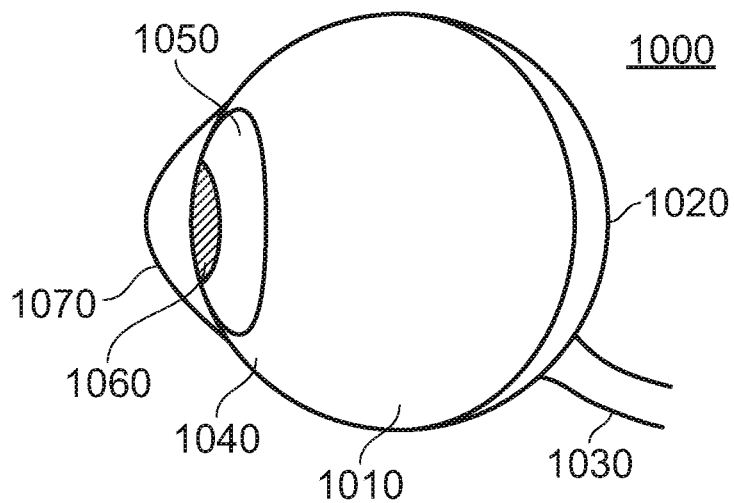
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
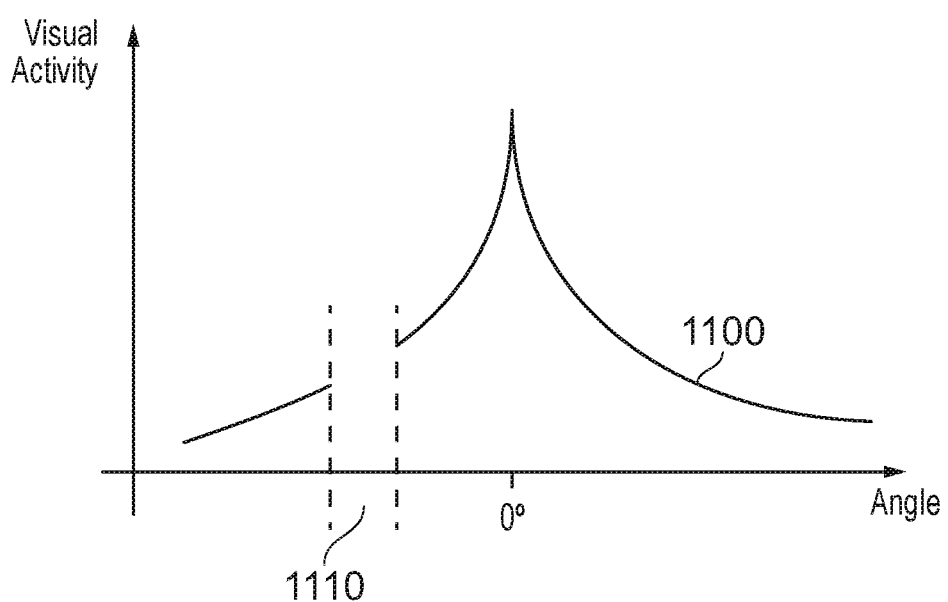
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

Saccades, and on a smaller scale micro-saccades, are identified as fast motions in which the eyes rapidly move between different points of focus (often in a jerky fashion). This may be considered as ballistic motion, in that once the movement has been initiated it cannot be altered. Saccades are often not conscious eye motions, and instead are performed reflexively to survey an environment. Saccades may last up to two hundred milliseconds, depending on the distance rotated by the eye, but may be as short as twenty milliseconds. The speed of a saccade is also dependent upon the total rotation angle; typical speeds may be between two hundred and five hundred degrees per second.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user. Such motions may be reflexive or intentional, and can often interfere with eye tracking as they will obscure vision of the eye, and the eye is often not stationary during such a motion.

As discussed above, many gaze tracking arrangements (such as those shown in FIGS. 6a and 6b) comprise cameras that are directed towards the user's eyes from a forwards position (either directly, or indirectly via a mirror). Such arrangements are considered advantageous in that reliable image of the user's pupil is able to be obtained, allowing an accurate tracking process to be performed.

Embodiments of the present disclosure instead comprise an arrangement of one or more cameras that image the user's eye (or eyes) from a different angle, without seeking to capture images of the user's pupil. Instead, the camera or cameras are provided so as to be able to image the shape of the user's eye. This may provide a number of advantages, a selection of which is described below.

Figure 12:
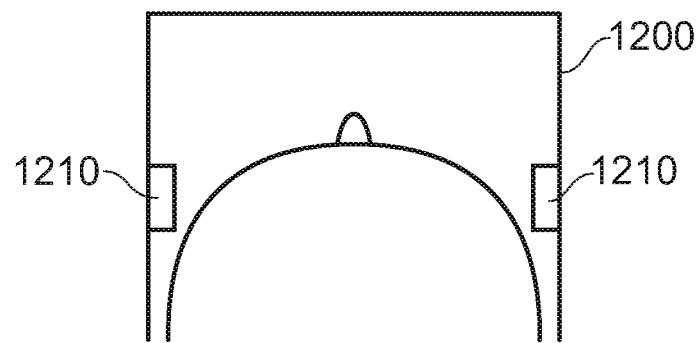
FIG. 12 schematically illustrates a gaze tracking arrangement.

FIG. 12 schematically illustrates an arrangement in line with embodiments of the present disclosure. In this Figure the head-mountable unit 1200 is provided with a pair of cameras 1210 which are arranged at the side of the user's head, each of the cameras 1210 being operable to capture images of the corresponding one of the user's eyes. As is apparent from the relative locations of the cameras 1210 and the user's eyes, the captured images are effectively a side view of the eyes. In some embodiments, the head-mountable unit 1200 may further comprise a display; that is, the gaze tracking system may be implemented as a part of an HMD arrangement.

In some embodiments, it is considered that the cameras 1210 may instead be located at the opposite side of the user's eyes; that is, the cameras 1210 may be proximate to the user's nose. This may be advantageous in that a small distance to the user's eyes in ensured, although if the cameras 1210 are too large this may cause an obstruction in the user's views. In some embodiments, it is considered that multiple sets of cameras 1210 may be provided as appropriate to generate a comprehensive view; this may reduce tracking errors due to extreme eye motion in a particular direction, for instance.

As shown in FIG. 10, the human eye is non-spherical such that the cornea (1070 in FIG. 10) may form a noticeable protrusion on the eye. When imaged from the side, as would be the case in the arrangement of FIG. 12, the surface of the eye would not appear as a uniform curve; instead, a curve distorted by the presence of the cornea will be present. FIGS. 13a-13d, discussed below, schematically illustrate examples of such curves.

The location of the distortion to the eyeball's curve (that is, the location of the cornea within the captured image) is indicative of the direction in which the user's eye is facing relative to the camera. Both the position and the magnitude of the distortion may be considered as appropriate inputs for identifying this direction. Of course, this direction is indicative of the gaze direction of the user—and by identifying a direction of each eye it may be possible to identify convergence upon a point of focus or the like.

The size of the curve defined by the cornea may refer to either or both of the length of the curve or the height of the curve. The former is a measure of the length of the vertical segment of the cornea that is being viewed. In this case the centre of the cornea has the longest curve (as it extends the full diameter of the cornea, from top to bottom), while a vertical segment taken as the halfway point between the centre and the edge of the cornea nearest to the camera will have a length of approximately eighty-five percent of the longest possible curve when the cornea is modelled as a sphere. In some cases, an approximation of the length may be generated using a line drawn between the start and end of the curve (that is, the points at which the cornea is seen to meet the rest of the eyeball), or the length of the curve of the eyeball that is occupied by the cornea may be used as an alternative.

In the latter option for defining the length, the distance between the peak of the curve and the corresponding location of the curve representing the curve representing the eyeball itself is identified. This effectively represents the thickness of the cornea across the segment that is imaged. As with the above definition, the centre of the cornea will have the highest distance with the value decreasing towards the edge of the cornea.

In either case, it becomes possible to identify which vertical segment of the cornea is being measured, which is then indicative of the orientation of the eye that is required to cause that vertical segment to be imaged. In some cases, for example if both measures of the size are considered, the shape of the curve is identified. Here, the shape may refer to the gradient of the curve at one or more locations on the vertical segment, for example, or a size/shape of a circular segment that is representative of the identified curve.

Of course, any suitable metric may be determined for the purpose of characterising the imaged portion of the cornea; the requirement is that it is possible to identify which portion of the cornea is being imaged.

Such an arrangement may be suitable in any gaze tracking application. While it is considered useful for VR content in which a display is present in the HMD 1200 and this occupies the user's entire view, mixed (augmented) reality embodiments are also appropriate, as are those in which a head-mountable gaze tracking unit is provided without a corresponding display (for example, to be used with a television or other interactive elements that are not head-mounted but may adapt their operation in dependence upon user's gaze information).

FIGS. 13a-13d schematically illustrate exemplary positions of a user's eye as captured by a camera in the arrangement described with reference to FIG. 12. The shape and/or size of the cornea may be exaggerated in some of these examples for the sake of clarity within the image; it should be noted that the shape and/or size may also vary between different, and as such it may be advantageous to perform a measurement or calibration process prior to performing tracking using a specific user's eyes as a reference.

Figure 13A:
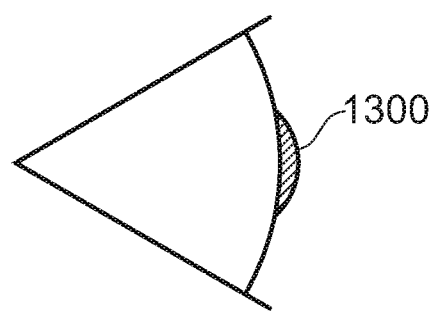
FIGS. 13*a*-13*d* schematically illustrate exemplary positions of a user's eye in captured images.

FIG. 13a shows a side view of the eye in a neutral position—that is, a position in which the user is gazing directly ahead while focusing on an object a large distance away. The cornea 1300 is represented by the hatched area, which in this example has a relatively large size and represents a significant deviation from the curve of the rest of the user's eyeball.

Figure 13B:
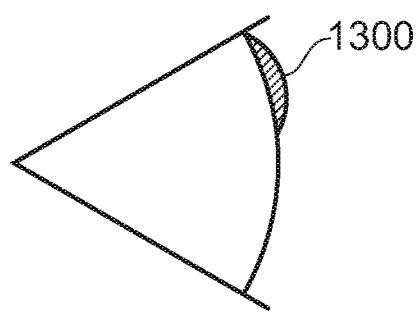

FIG. 13b shows a side view of the eye in a looking-up position; that is, a position in which the user is looking in an upwards direction. While a similar amount of the cornea 1300 is visible, the location of the cornea 1300 is changed relative to FIG. 13a. FIG. 13b therefore illustrates that a vertical change in gaze direction can be identified based upon the vertical position of the cornea 1300 in the image.

Figure 13C:
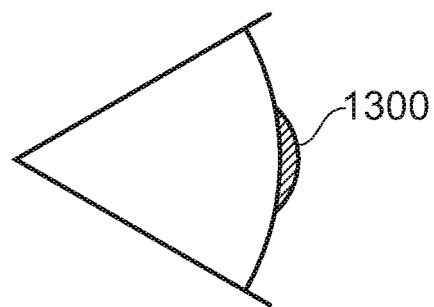

FIG. 13c shows a side view of an eye looking away from the camera; that is, an eye that is rotated inwards towards the nose in the case that a camera is provided in a location as shown in FIG. 12. This is associated with user focus on an object that is near to the user, causing an increase in vergence, or with viewing an object the opposite side of the user to the camera capturing that image of the user's eye. The distinction between these can be identified by tracking both of the user's eyes, or by using contextual information (such as information about content being viewed on a display by a user); any other suitable measurements or inputs may also be used to determine the user gaze tracking as an alternative or additional consideration.

Figure 13D:
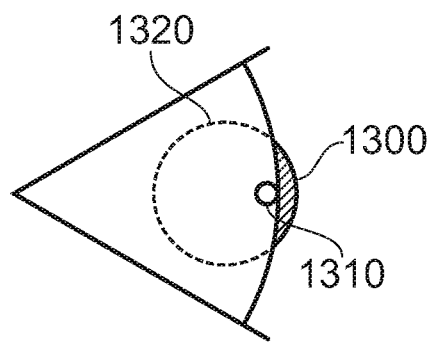

FIG. 13d shows a side view of the eye in a position in which the cornea 1300 is rotated towards the camera; this is indicated by the presence of the pupil 1310, with the dashed line 1320 representing the boundary of the cornea (although this may not be detected in some embodiments of the present disclosure). This is generally associated with a user choosing to focus on an object that is the same side of the user's head as the camera. The cornea 1300 as shown in these images may present only a small curve relative to the eyeball, and as such is may be considered useful to factor in additional measurements such as pupil or iris detection. This may be achieved in any suitable manner, such as via image processing to detect the pupil or iris as a separate element or by determining an average colour of the image (or at least a portion of the image) to determine whether a significant amount of the white of the eye is visible.

Of course, more complex motions than those discussed above may be observed; it would be apparent that combinations of motions (such as a change in gaze direction that causes both a horizontal and a vertical motion of the eye) are possible. Such motions may be identified in any suitable manner; in some examples, the horizontal and vertical displacements may be treated separately and then combined to identify a gaze direction. Alternatively, the identified location of the cornea may be directly mapped to an eye orientation and/or gaze direction as appropriate.

As noted above, further detections or determinations may also be made to assist in generating more accurate and/or precise gaze direction data. Examples include any suitable method for locating the iris or pupil in a captured image, or any additional information relating to potential viewing targets or focus objects for a user.

Figure 14:
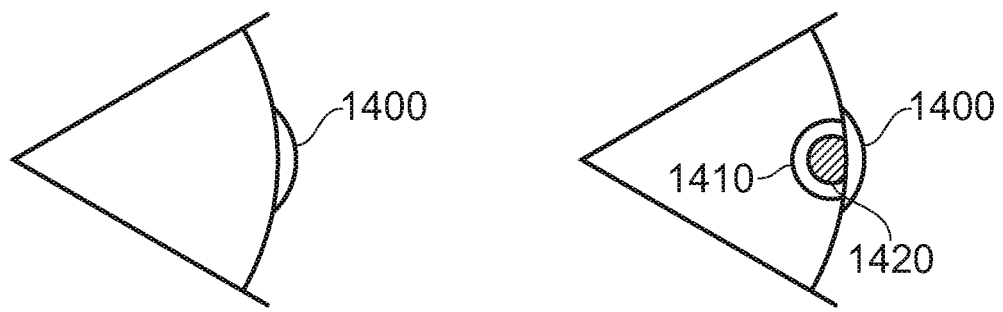
FIG. 14 schematically illustrates additional side views of an eye.

FIG. 14 schematically illustrates an example of using the captured images of the eye to refine the gaze tracking measurement. FIG. 14 shows two images, captured from the side, of an eye in which the cornea 1400 is shown to have a similar curve relative to rest of the eyeball. In the first image, the user is looking away from the camera while in the second the user is looking towards the camera (or at least substantially in those directions, rather than necessarily focusing on or away from the camera specifically).

As can be seen from the Figure, each of these images shows different features. The first image comprises a much higher proportion of the white of the eye than the second image, while the second image comprises at least a part of the iris 1410 and pupil 1420 as identifiable image features. Any part (or indeed all) of this information may be used to distinguish between the different cases in which the cornea 1400 is represented by a similar curve in the captured images.

As discussed above, further measurements or information may also (or instead) be considered to supplement the gaze direction detection based upon the cornea shape/size. Another example is that of using user head motion as an input. Such motion can be detected optically (via a remote or local camera, for instance) or using any suitable hardware motion detector such as an accelerometer or gyroscope. While the specific relationship between head and eye motion may be determined independently for any given user, one example is that of a user's head motion in a particular direction often being correlated with eye motion in that same direction as a user responds to a visual stimulus. That is to say that it is common for users to use both head and eye motion in combination to view an object that is not located directly in front of them.

It is apparent from the above discussion that in some cases a calibration process may be appropriate so as to ensure that a gaze tracking method is suitably accurate and/or precise for a given user. Such a calibration may take any suitable format; for instance, guided viewing while performing the tracking process (so as to instruct a user to look in a particular direction or to focus on a particular object) may be used. Such calibration may not be necessary for many people however, particularly if the required level of accuracy and/or precision may be low for a particular application.

Such a calibration process may be used to identify specific information to be used in a gaze tracking for that particular user; alternatively, or in addition, a user may be categorised based upon the results into one or more predetermined categories that describe a particular type of user. These groups may be determined based upon cornea shape/size, typical correspondence between eye and head motion, or any suitable parameter.

Figure 15:
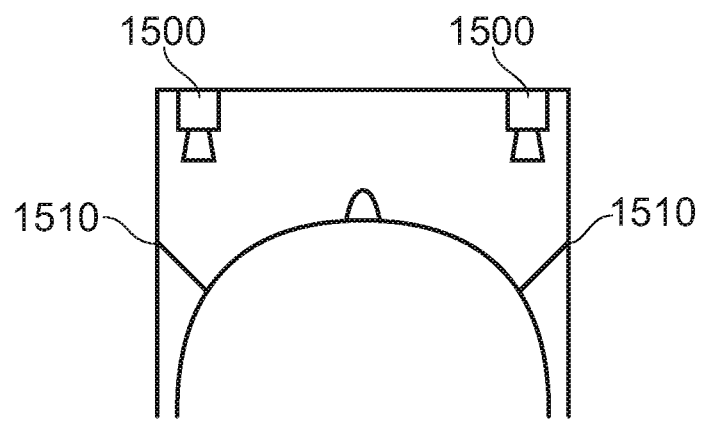
FIG. 15 schematically illustrates an alternative gaze tracking arrangement.

FIG. 15 schematically illustrates an arrangement in which cameras are provided in such a way so as to enable images to be indirectly captured of the user's eye profile.

In this example, cameras 1500 are instead located in front of the user, and corresponding mirrors 1510 are provided adjacent to (or at least near to) the user's eyes so as to enable a respective side-image of each of the user's eyes to be captured as has been described above. This may be advantageous in that a more efficient use of space within a head-mountable unit may be provided, or in that a more ergonomic device may be provided as the width may be reduced relative to having cameras mounted either side of the user's eyes.

Of course, the specific location of the cameras 1400 may be selected freely, and a corresponding selection of mirrors and/or lenses may also be provided so as to enable an appropriate image to be captured for implementing a tracking method according to the present disclosure. In some embodiments, a single camera and optics arrangement is provided for each eye; in others, a single camera may be provided with an associated optics arrangement that enables images of both eyes to be captured simultaneously or using a mirror flutter technique so as to capture independent images of each eye at a high frame rate using a single camera. Equally, the cameras 1400 may be located towards the rear of the head-mountable device with corresponding optics to enable suitable images to be captured; this may assist with improving a weight distribution of the device or the like.

Figure 16:
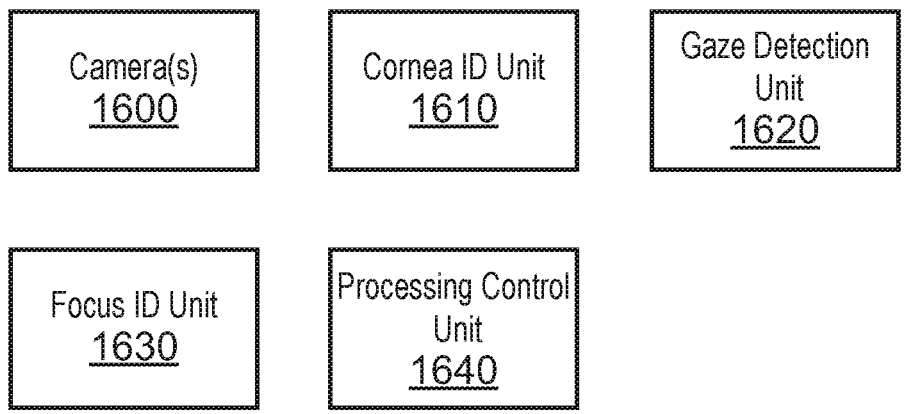
FIG. 16 schematically illustrates a gaze tracking system.

FIG. 16 schematically illustrates a gaze tracking system for implementing embodiments of the present disclosure. This system comprises one or more cameras 1600, a cornea identification unit 1610, a gaze detection unit 1620, a focus identification unit 1630, and a processing control unit 1640. These units may be provided in any suitable combination of devices, or in a single device, as appropriate for a particular implementation. In some embodiments, one or more units of the gaze tracking system are embodied in a head-mountable display device.

Further functional units may of course be provided within this system as appropriate; the system need not be limited to those units shown in FIG. 16. For example, one or more communication units may be provided for transferring data between devices, and additional devices (such as those able to be controlled by gaze inputs) may also be provided as a part of the system where appropriate.

The one or more cameras 1600 are operable to capture one or more images of a side view of one or both of a user's eyes. As discussed above with reference to FIGS. 12 and 15, this may be achieved by using one or more cameras 1600 located next to the user's eyes so as to be able to capture a side view of the corresponding eye directly; equally, the one or more cameras 1600 may be located remotely from the user's eyes, and one or more optic elements (such as lenses and mirrors) are provided to enable images of side views of one or both of the user's eyes to be captured.

The cameras 1600 may be visible light cameras in some embodiments, while in others alternative cameras may be preferred; for example, infra-red cameras may be considered particularly appropriate in a number of embodiments.

The phrase 'side view' when discussing capturing images of the user's eyes may be interpreted to mean capturing an image of the user's eye from any angle at which it is possible to identify the curve of the cornea relative to that of the user's eyeball for a significant range of orientations of the user's eye. This is distinct from traditional eye tracking methods, in which a front view of the user's eyes is used so as to be able to capture images suitable for locating the user's pupil. In practical terms, a side view of the user's eye in the sense of the present disclosure therefore means an image which includes approximately one half of that eye due to the eye being viewed from a position that is towards the periphery of the user's view.

Of course, in some cases the tracking may fail (for example, for extreme left- or right-wards motion of the user's eye or eyes) due to the cornea's curve not being visible to the camera; however such edge cases should not be considered to modify the definition of 'side view' so long as a suitable tracking method can be performed for a significant range of eye orientations. It is also noted that such cases would be rare during normal use, as such extreme eye positions are often uncomfortable for a user to hold for any extended period. Further to this, maintaining such extreme eye positions while still remaining focused and performing significant motions that would be desirable to track are likely to be rarer occurrences still.

To provide possible example locations of a camera relative to an eye so as to capture direct images, consider a line which it intersects both the user's corneas when in a neutral position (that is, focused at infinity directly ahead of the user) so as to be parallel to the user's face. A suitable camera position may be anywhere along this line, as well as any appropriate distance from the line. For example, the volume defined by a cylinder that is coaxial with this imaginary line may define a number of suitable positions where physical constraints do not prevent camera placement (and user vision is not unduly disrupted). Exemplary radii for such a cylinder include half a centimetre, one centimetre, two centimetres, five centimetres, or indeed any other integer or non-integer value. This cylinder may extend any suitable distance away from the eyes; the distance may be dependent upon image quality constraints such as an effective resolution of the camera. Example values for the length of the cylinder (that is, the region in which it is considered that suitable camera placements may be found) include one, two, five, or ten centimetre either side of the user's eyes—although of course other values may be appropriate.

As noted above, it is not necessary that the cameras themselves be located within this region; it is also considered that arrangements are possible in which the cameras are located elsewhere (in line with the discussion surrounding FIG. 15). In such cases, the provided optical arrangement may be used to simulate the positioning of a camera within such a region. For example, a mirror located within this region may be considered appropriate for a more remote camera arrangement; it is the position of the eye within the captured image that is considered to be important for tracking rather than the relative positions of the eye and camera themselves.

In some cases, it may be more appropriate to consider an angular definition of suitable camera placement. Considering a neutral position of one of the user's eyes, a suitable camera placement may be in a region that is at zero degrees vertically (that is, at the same height as the user's eye) and ninety degrees horizontally (that is, at a right angle to the gaze direction of that eye in a neutral position). Of course, suitable ranges of angles about these values may also be considered appropriate; cameras located in a region plus/minus five, ten, or fifteen degrees about these defined values may still provide appropriate images of the user's eyes. Any suitable angles or ranges of angles may be chosen, insofar as useful images of the shape of the cornea relative to the eyeball may be obtained.

Of course, the camera placement should effectively be governed by the requirement of capturing suitable images for an accurate gaze tracking method and the skilled person would be capable of selecting suitable parameters in view of this requirement and the teaching of this disclosure. In view of this, any suitable combination of the values discussed above with relation to defining a suitable camera placement region may be considered appropriate as well as any other values not explicitly disclosed insofar as they define a suitable region.

The cornea identification unit 1610 is operable to identify the location and size of a cornea in one or more of the captured images. This may comprise determining one or both of the horizontal and vertical location of the cornea (and therefore horizontal and vertical orientation of the eye) based upon the size and/or shape of the curve generated by the cornea. This curve may be considered relative to the curve of the eyeball itself, in some embodiments, and may be measured in any suitable manner; a number of possible measures are described above.

In some embodiments, the cornea identification unit 1610 is operable to determine the location of one or both of an iris and pupil in a captured image. This can be performed using any suitable image processing technique; for example, edge detection or pattern recognition may be used. The detection of one or both of these elements may be advantageous in providing additional information about the gaze direction when taken in conjunction with the information about the imaged portion of the cornea. For example, this may assist in determining whether it is the left or right side of the cornea that is being imaged.

Alternatively, or in addition, the cornea identification unit 1610 may be operable to determine a representative colour of one or more regions of a captured image. These regions may be selected freely; for example, the captured image may be split up into a number of uniform regions or one or more regions may be defined so as to specifically correspond to the user's eye. However the regions are selected, the function is to determine a representative colour; this may be determined in any suitable manner—such as an average pixel colour or a most common pixel colour. This can be used to identify how much of the user's iris or pupil is visible in a more indirect manner (so as to avoid performing a specific detection process), and thereby provide information to assist in identifying the gaze direction of the user in addition to the cornea detection process. For example, this may assist in determining whether it is the left or right side of the cornea that is being imaged.

The gaze detection unit 1620 is operable to determine a direction of the user's gaze in dependence upon the identified location of the cornea in the one or more captured images. As noted above, additional information (such as the colour information) may be used to characterise the gaze direction; this may further include contextual information such as information relating to content being viewed or objects/devices being interacted with. In some embodiments, the gaze detection unit 1620 is operable to identify an amount of vergence between the user's eyes; this is a measure of the relative gaze directions of each eye.

The focus identification unit 1630 is operable to identify a focal region of the user; this may be based upon the vergence identified by the gaze detection unit 1620, in some examples. While this may comprise simply identifying a point in space that is focused upon (or a surface or volume, depending on the application and the level of precision that is provided), in some embodiments this may further (or instead) comprise the identifying of an object within the focal region of the user. In some cases, the object is a virtual object (such as an object in a video or in a game) presented to the user on a display—for instance, the object may be presented on a display provided in an HMD or on an unrelated television or the like.

The processing control unit 1640 is operable to generate instructions for controlling processing in dependence upon the detected gaze direction. For example, a device may be controlled to perform a particular function (such as turning on a device that is focused upon), or a game may be controlled. Similarly, processing may be modified (such as a foveal rendering process) without generating any direct inputs to a process related to desired control by a user.

The arrangement of FIG. 16 is an example of a processor (for example, a GPU and/or CPU located in a games console or any other computing device) that is operable to perform, in conjunction with one or more cameras, a gaze tracking method according to embodiments of the present disclosure, and in particular is operable to:

capture one or more images of a side view of one or both of a user's eyes;

identify the location and size of a cornea in one or more of the captured images; and determine a direction of the user's gaze in dependence upon the identified location of the cornea in the one or more captured images.

Figure 17:
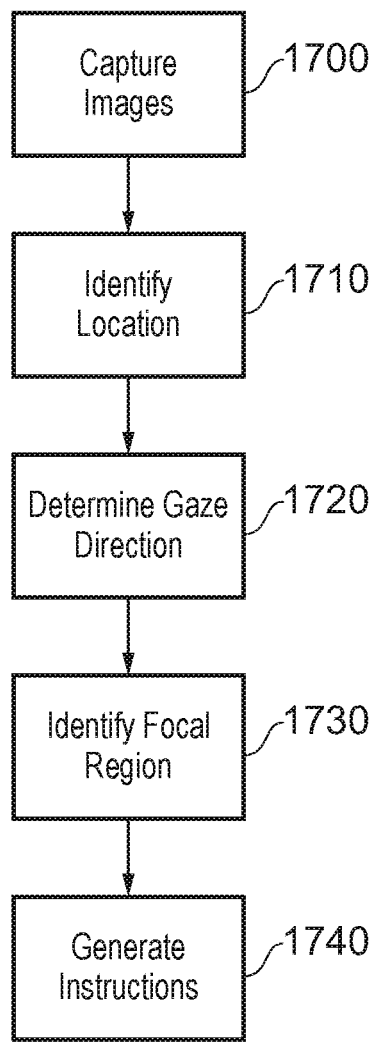
FIG. 17 schematically illustrates a gaze tracking method.

FIG. 17 schematically illustrates a gaze tracking method in line with embodiments of the present disclosure.

A step 1700 comprises capturing one or more images of a side view of one or both of a user's eyes.

A step 1710 comprises identifying the location and size of a cornea in one or more of the captured images.

A step 1720 comprises determining a direction of the user's gaze in dependence upon the identified location of the cornea in the one or more captured images.

An optional step 1730 comprises identifying a focal region of the user.

An optional step 1740 comprises generate instructions for controlling processing in dependence upon the detected gaze direction.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be provided in accordance with one or more of the following numbered clauses:

1. A gaze tracking system comprising:
    one or more cameras operable to capture one or more images of a side view of one or both of a user's eyes;
    a cornea identification unit operable to identify the location and size of a cornea in one or more of the captured images; and
    a gaze detection unit operable to determine a direction of the user's gaze in dependence upon the identified location and size of the cornea in the one or more captured images.
2. A gaze tracking system according to clause 1, wherein both of the user's eyes are imaged.
3. A gaze tracking system according to clause 2, wherein the gaze detection unit is operable to identify an amount of vergence between the user's eyes.
4. A gaze tracking system according to any preceding clause, comprising a focus identification unit operable to identify a focal region of the user.
5. A gaze tracking system according to clause 4, wherein the focus identification unit is operable to identify an object within the focal region of the user.
6. A gaze tracking system according to clause 5, wherein the object is a virtual object presented to the user on a display.
7. A gaze tracking system according to any preceding clause, wherein the cornea identification unit is operable to determine the location of one or both of an iris and pupil in a captured image.
8. A gaze tracking system according to any preceding clause, wherein the cornea identification unit is operable to determine a representative colour of one or more regions of a captured image.
9. A gaze tracking system according to any preceding clause, wherein one or more of the cameras are located next to the user's eyes so as to be able to capture a side view of the corresponding eye directly.
10. A gaze tracking system according to any preceding clause, wherein one or more of the cameras are located remotely from the user's eyes, and one or more optic elements are provided to enable images of side views of one or both of the user's eyes to be captured.
11. A gaze tracking system according to any preceding clause, wherein one or more units of the gaze tracking system are embodied in a head-mountable display device.
12. A gaze tracking system according to any preceding clause, comprising a processing control unit operable to generate instructions for controlling processing in dependence upon the detected gaze direction.
13. A gaze tracking method comprising:
    capturing one or more images of a side view of one or both of a user's eyes;
    identifying the location and size of a cornea in one or more of the captured images; and
    determining a direction of the user's gaze in dependence upon the identified location and size of the cornea in the one or more captured images.
14. Computer software which, when executed by a computer, causes the computer to carry out the method of clause 13.
15. A non-transitory machine-readable storage medium which stores computer software according to clause 14.

The invention claimed is:

1. A gaze tracking system comprising:
    one or more cameras operable to capture one or more images of a side view of one or both of a user's eyes;
    a cornea identification unit operable to identify the location and size of a cornea based on detection of a protrusion of the cornea from a side-view in one or more of the captured images; and
    a gaze detection unit operable to determine a direction of the user's gaze in dependence upon the identified location and size of the cornea in the one or more captured images, wherein:
    the cornea identification unit is operable to determine a representative colour of one or more regions of a captured image, and the representative colour is used to determine the gaze direction in conjunction with the detection of the protrusion of the cornea,
    both of the user's eyes are imaged, and
    the gaze detection unit is operable to identify an amount of vergence between the user's eyes in dependence upon the user's gaze direction of each eye as determined using the representative colour in conjunction with the detection of the protrusion of the cornea from the side-view.

2. The gaze tracking system of claim 1, comprising a focus identification unit operable to identify a focal region of the user.

3. The gaze tracking system of claim 2, wherein the focus identification unit is operable to identify an object within the focal region of the user.

4. The gaze tracking system of claim 3, wherein the object is a virtual object presented to the user on a display.

5. The gaze tracking system of claim 1, wherein the cornea identification unit is operable to determine the location of one or both of an iris and pupil in a captured image.

6. The gaze tracking system of claim 1, wherein one or more of the cameras are located next to the user's eyes so as to be able to capture a side view of the corresponding eye directly.

7. The gaze tracking system of claim 1, wherein one or more of the cameras are located remotely from the user's eyes, and one or more optic elements are provided to enable images of side views of one or both of the user's eyes to be captured.

8. The gaze tracking system of claim 1, wherein one or more units of the gaze tracking system are embodied in a head-mountable display device.

9. The gaze tracking system of claim 1, comprising a processing control unit operable to generate instructions for controlling foveal rendering processing in dependence upon the detected gaze direction.

10. A gaze tracking method comprising:
capturing one or more images of a side view of one or both of a user's eyes;
identifying the location and size of a cornea based on detection of a protrusion of the cornea from a side-view in one or more of the captured images; and
determining a direction of the user's gaze in dependence upon the identified location and size of the cornea in the one or more captured images, wherein:
the identifying includes determining a representative colour of one or more regions of a captured image, and the representative colour is used to determine the gaze direction in conjunction with the detection of the protrusion of the cornea,
both of the user's eyes are imaged, and
the determining includes identifying an amount of vergence between the user's eyes in dependence upon the user's gaze direction of each eye as determined using the representative colour in conjunction with the detection of the protrusion of the cornea from the side-view.

11. A non-transitory machine-readable storage medium which stores computer software which, when executed by a computer, causes the computer to perform a gaze tracking method comprising the steps of:
capturing one or more images of a side view of one or both of a user's eyes;
identifying the location and size of a cornea based on detection of a protrusion of the cornea from a side-view in one or more of the captured images; and
determining a direction of the user's gaze in dependence upon the identified location and size of the cornea in the one or more captured images, wherein:
the identifying includes determining a representative colour of one or more regions of a captured image, and the representative colour is used to determine the gaze direction in conjunction with the detection of the protrusion of the cornea,
both of the user's eyes are imaged, and
the determining includes identifying an amount of vergence between the user's eyes in dependence upon the user's gaze direction of each eye as determined using the representative colour in conjunction with the detection of the protrusion of the cornea from the side-view.

* * * * *